United States Patent
Chen et al.

(10) Patent No.: US 11,947,857 B2
(45) Date of Patent: Apr. 2, 2024

(54) INKJET PRINTER SYSTEM

(71) Applicant: Hitachi Industrial Equipment Systems Co., Ltd., Tokyo (JP)

(72) Inventors: Huilin Chen, Tokyo (JP); Takahiro Takahashi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 18/015,916

(22) PCT Filed: May 28, 2021

(86) PCT No.: PCT/JP2021/020458
§ 371 (c)(1),
(2) Date: Jan. 12, 2023

(87) PCT Pub. No.: WO2022/014176
PCT Pub. Date: Jan. 20, 2022

(65) Prior Publication Data
US 2023/0289122 A1    Sep. 14, 2023

(30) Foreign Application Priority Data
Jul. 14, 2020    (JP) ................................. 2020-120284

(51) Int. Cl.
*G06F 3/12*    (2006.01)
*G06F 21/60*    (2013.01)

(52) U.S. Cl.
CPC .......... *G06F 3/1289* (2013.01); *G06F 3/1225* (2013.01); *G06F 21/608* (2013.01)

(58) Field of Classification Search
USPC ...................................................... 358/1.15
See application file for complete search history.

(56) References Cited

U.S. PATENT DOCUMENTS

2011/0085204 A1    4/2011    Hamada et al.
2015/0293732 A1*   10/2015   Kyoo ................. G06F 21/608
                                                 358/1.14
(Continued)

FOREIGN PATENT DOCUMENTS

JP    2011-101338 A    5/2011
JP    2014-96751 A     5/2014
(Continued)

OTHER PUBLICATIONS

International Search Report (PCT/ISA/210) issued in PCT Application No. PCT/JP2021/020458 dated Aug. 31, 2021 with English translation (six (6) pages).

(Continued)

*Primary Examiner* — Jacky X Zheng
(74) *Attorney, Agent, or Firm* — Crowell & Moring LLP

(57) ABSTRACT

A network environment is built in an already-existing production line without significant cost to provide a novel and user-friendly inkjet printer system. A portable repeater 3 includes a carriageable storage unit and is interposed between an inkjet printer 6 and a server 5. The inkjet printer 6 and the repeater 3 are communicated with other over short-range wireless 2 to transmit print related data from the inkjet printer 6 to the repeater 3 or from the repeater 3 to the inkjet printer 6, and the repeater 3 and the server 5 are communicated with each other over a communication network 4 to transmit the print related data either from the server 5 to the repeater 3 or from the repeater 3 to the server 5. This enables building of the network environment in an already-existing production line without significant cost.

7 Claims, 7 Drawing Sheets

(56) References Cited

U.S. PATENT DOCUMENTS

2016/0224288 A1* 8/2016 Nogawa ................ G06F 3/1203
2017/0094078 A1* 3/2017 Ohara ................ H04N 1/00042

FOREIGN PATENT DOCUMENTS

JP      2014-216834 A    11/2014
JP       2020-26057 A     2/2020

OTHER PUBLICATIONS

Japanese-language Written Opinion (PCT/ISA/237) issued in PCT Application No. PCT/JP2021/020458 dated Aug. 31, 2021 (four (4) pages).

* cited by examiner

FIG. 6

| PRINTER LIST | | |
|---|---|---|
| PRINTER ID | TYPE | OPERATING STATUS |
| 001 | UX-160W | NORMAL |
| 002 | UX-161W1P | NORMAL |
| 003 | UX-161J | NORMAL |
| 004 | UX-160W | PREVIOUS CONTROL SOFTWARE VERSION |
| 005 | UX-E160W | LOW INK LEVEL |

FIG. 7

DETAILS OF PRINTER 02

| DATA ID | TYPE | STATE | DATA AND TIME | | |
|---|---|---|---|---|---|
| 005 | PRINT DATA | — | 2020.03.18 | OPEN | DELETE |
| 004 | OPERATING INFORMATION | NORMAL | 2020.03.17 | OPEN | DELETE |
| 003 | BACKUP | — | 2020.03.0.1 | OPEN | DELETE |
| 002 | SYSTEM | — | 2019.12.07 | OPEN | DELETE |
| 001 | PRINT DATA OPERATING INFORMATION | NORMAL | 2019..12.07 | OPEN | DELETE |

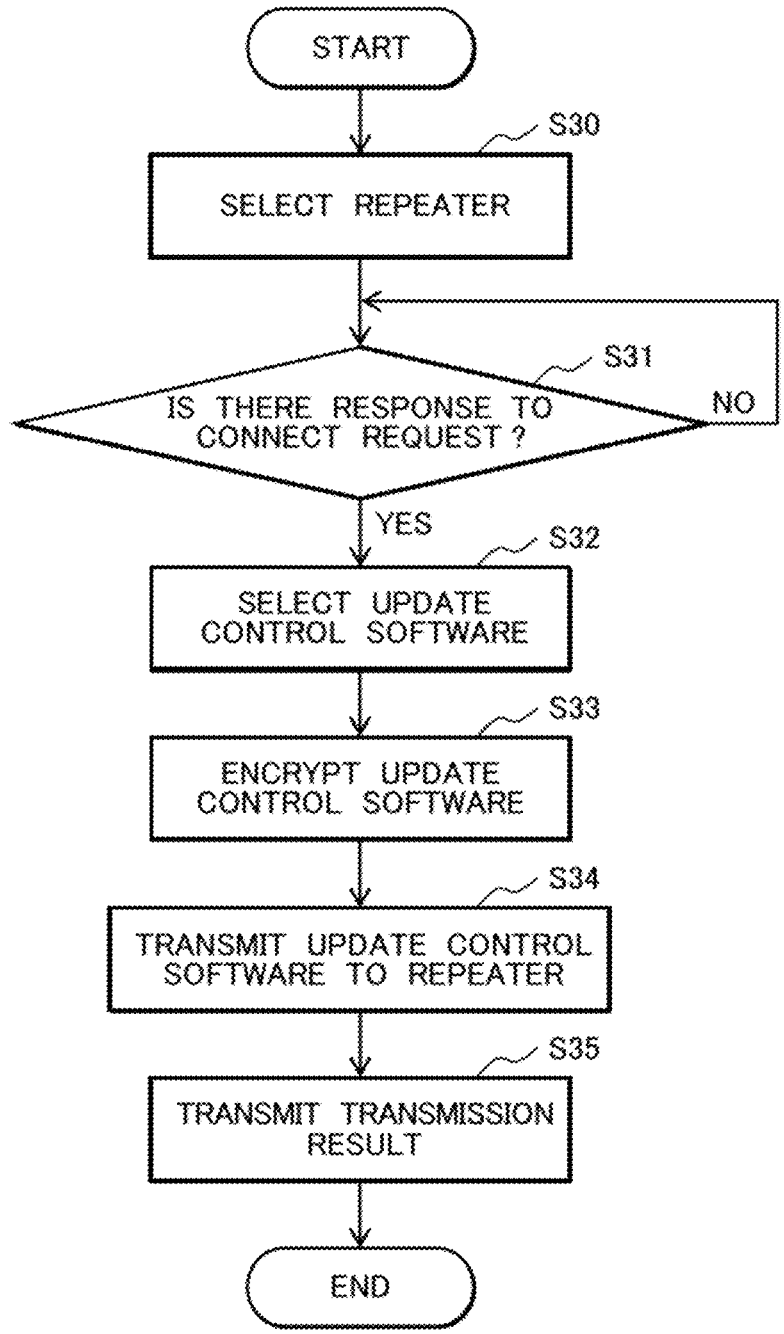

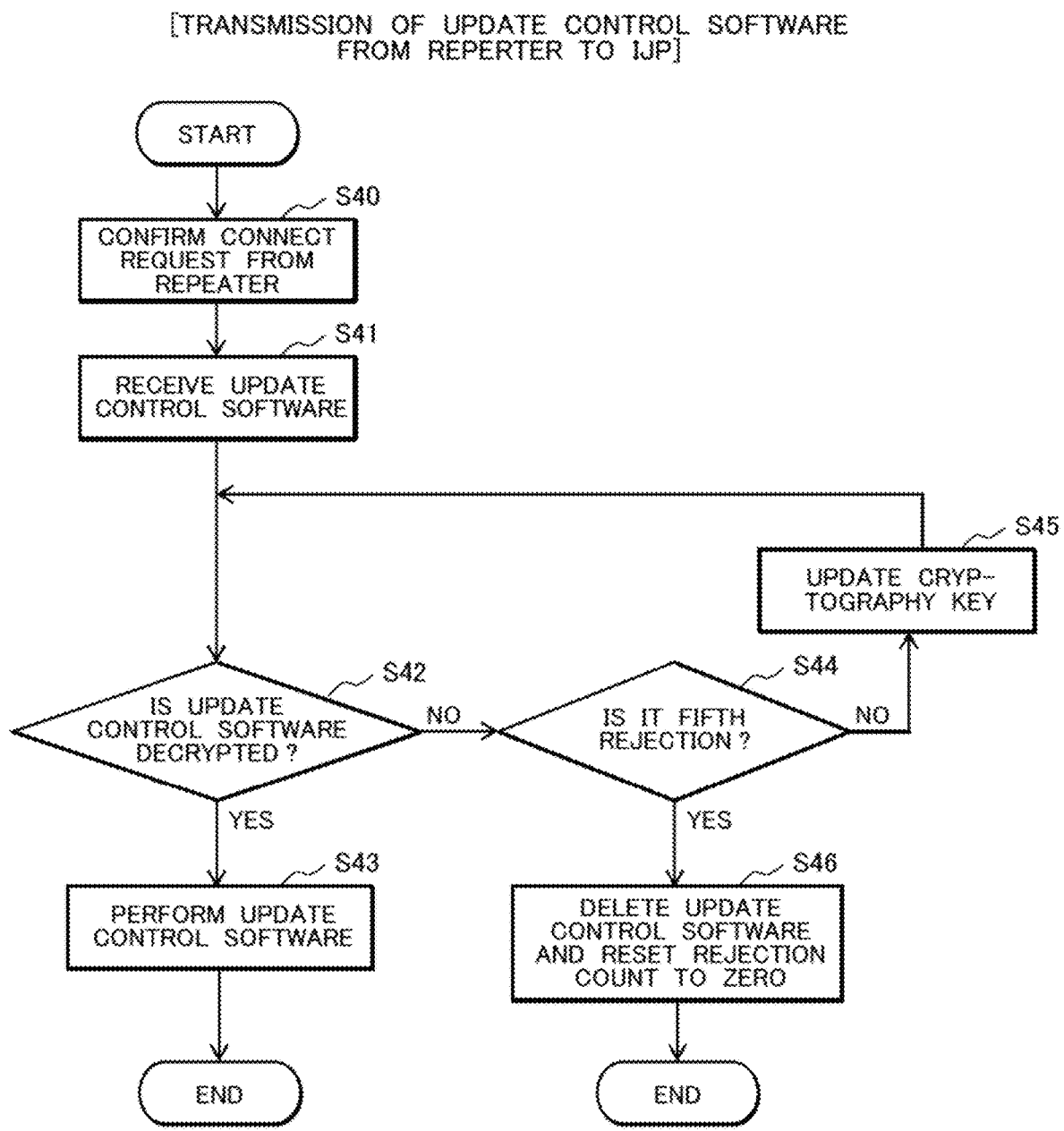

INKJET PRINTER SYSTEM

TECHNICAL FIELD

The present invention relates to an inkjet printer system and, more particularly, to an inkjet printer system with a plurality of inkjet printers being connected to a server over a communication network.

BACKGROUND ART

A continuous inkjet printer of a charge control type commonly used in production plants and the like includes an ink tank installed in its main body to store ink. The ink in the ink tank is fed to a print head by an ink supply pump. The ink fed to the print head is continuously ejected from an ink nozzle to produce ink droplets.

Of the ink droplets, ink droplets to be used in printing are electrically charged and deflected for flight to a print position of a desired object to be printed, and ink droplets put to no use in printing are collected by a gutter to be returned to the ink tank by an ink collection pump without being electrically charged and deflected.

And, a plurality of inkjet printers are installed on a production line in a production plant of sufficient large size to manufacture products such as packaging containers containing food, PET bottles filled with beverages and the like, in order to print a best-before date, a production plant, a product serial number and/or the like on the surface of a product.

In this connection, such inkjet printers are required to change the printing specifications for a best-before date, a production plant, a product serial number and/or the like. Therefore, the plurality of inkjet printers are connected to a server over a communication network so that changing the printing specifications of the plurality of inkjet printers takes effect by instructions from the server.

For example, a system described in Japanese Patent Application Laid-Open No. 2020-26057 (PTL 1) is known as the system of connecting the plurality of inkjet printers and the server. In PTL 1, each of the plurality of inkjet printers is configured to be directly connected to the communication network for connection to the server via the communication network. Therefore, for example, for changing the printing specifications, transmitting print data from the server to each of the inkjet printers facilitates change of the printing specifications of the plurality of inkjet printers.

CITATION LIST

Patent Literature

PTL 1: Japanese Patent Application Laid-Open No. 2020-26057

SUMMARY OF INVENTION

Technical Problem

Now, installation costs such as for communication facility and man-hours for installation are required for improvements of network environments in the already-existing production line. Thus, new communication environment is not easily built, and a need exists for easy building of an inkjet printer system. A need also exists for quick and easy performance of a control software upgrade on the inkjet printers and maintenance such as replenishment of consumables and the like.

It is an object of the present invention, particularly, to build a network environment in an already-existing production line without significant cost in order to provide a novel and user-friendly inkjet printer system. It is noted that print related data described below means data related to print, such as "text data" used for printing, "text size", "print speed", operating data of inkjet printers, control software, and the like.

Solution to Problem

An aspect of the present invention provides an inkjet printer system including a repeater of a portable type that includes a carriageable storage unit and is interposed between an inkjet printer and a server. The inkjet printer and the repeater are communicated with each other over short-range wireless to transmit print related data either from the inkjet printer to the repeater or from the repeater to the inkjet printer, and the repeater and the server are communicated with each other over a communication network to transmit the print related data either from the server to the repeater or from the repeater to the server.

Advantageous Effects of Invention

According to the present invention, it is possible to build a network environment in an already-existing production line without significant cost in order to provide a novel and user-friendly inkjet printer system.

BRIEF DESCRIPTION OF DRAWINGS

FIG. 6 is an explanatory diagram illustrating a display screen for printer management in access terminal equipment.

FIG. 7 is an explanatory diagram illustrating a display screen for data management of inkjet printers in access terminal equipment.

FIG. 8 is a flowchart illustrating a control flow for transmitting update control software from a server to a repeater.

FIG. 9 is a flowchart illustrating a control flow when an inkjet printer receives update control software from a repeater.

DESCRIPTION OF EMBODIMENTS

Although embodiments according to the present invention will now be described in detail with reference to the accompanying drawings, the present invention should not be construed as being limited to the following embodiments and the scope of the present invention encompasses various examples of modifications and applications in technical concepts of the present invention.

Figure 1:
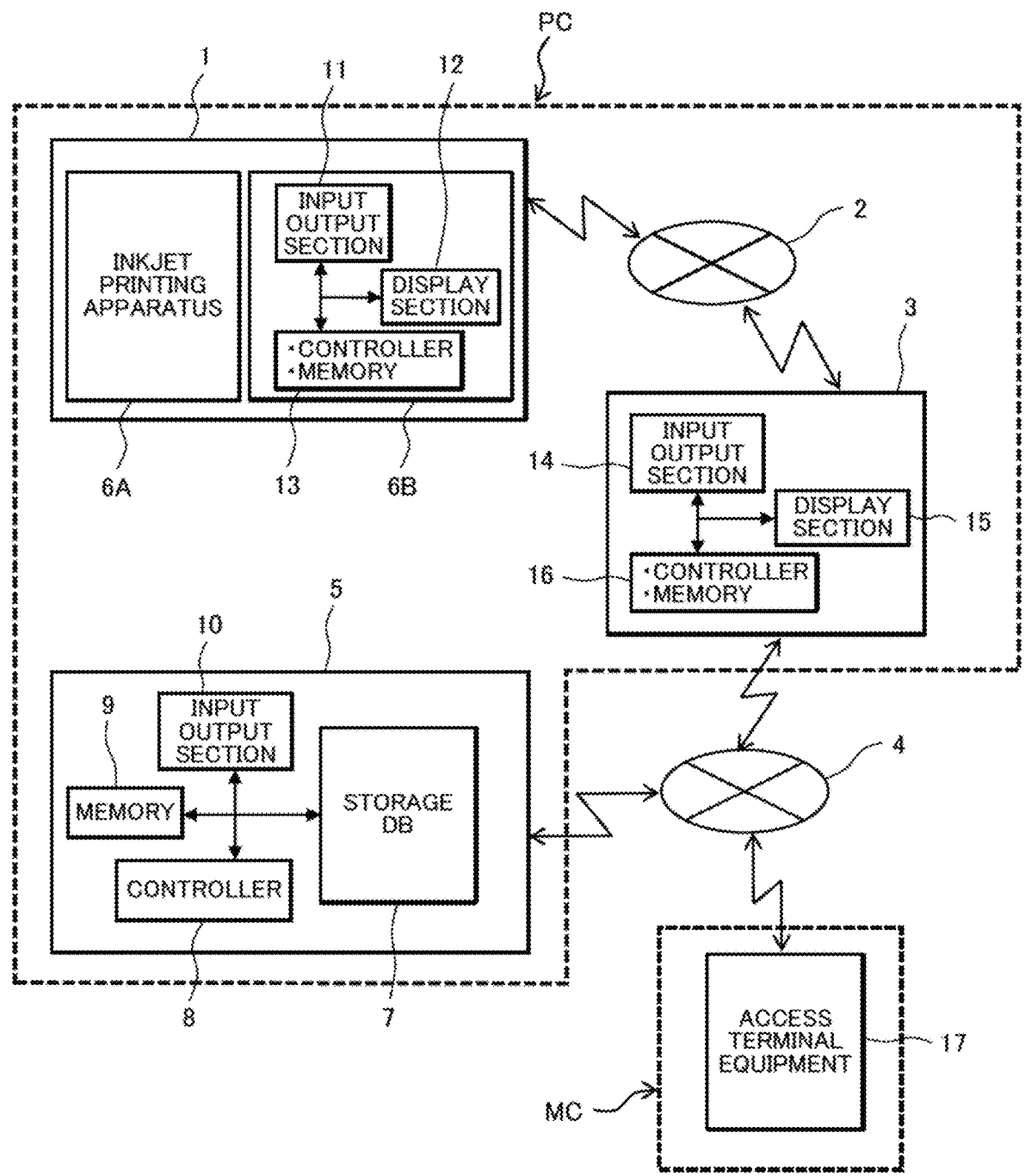
FIG. 1 is a block diagram of an inkjet printer system according to embodiments of the present invention.

Embodiments according to the present invention will be described with reference to FIG. 1. FIG. 1 illustrates the configuration of an inkjet printer system according to the embodiments. The inkjet printer system includes, in a basic configuration, a printer group 1 made up of a plurality of continuous inkjet printers of a charge control type, a cloud server (hereinafter referred to simply as a server) 5 functioning as a storage device, and a repeater 3 for relaying communications between the server 5 and the printer group 1.

And, the printer group 1, the repeater 3 and the server 5 belong to a production company (PC) that manufactures products (foods and beverages) on which printing is performed. Particularly, the printer group 1 and the repeater 3 are placed within a production plan, and are operated by a worker (operator) in the production plant. The repeater 3 here is a portable mobile terminal (so-called tablet terminal) which is capable of being carried by the worker (operator). Also, the server 5 is placed in a data center of the production company (PC), and operated by a worker (operator) of the data center. It is noted that the server 5 is a private cloud in the embodiments, but may be a public cloud.

The repeater 3 which is a portable mobile terminal includes a storing unit, and has: a function of temporarily storing print related data sent from the printer group 1, and then transmitting it to the server 5 as appropriate; and a function of temporarily storing print related data sent from the server, and then transmitting it to the printer group 1 as appropriate. That is, the repeater 3 includes, as described later, at least a short-range wireless communication unit, a network communication unit, and a temporary storage unit for temporarily storing print related data.

The printer group 1 and the repeater 3 establish communication with each other over a short-range wireless network 2. Bluetooth (registered trademark) is used as short-range wireless communication. The short-range wireless network 2 allows two-way data communication between the repeater 3 and inkjet printers of the printer group 1. Therefore, data may be transmitted from an inkjet printer of the printer group 1 to the repeater 3, and reversely, data may be transmitted from the repeater 3 to an inkjet printer of the printer group 1.

Also, the repeater 3 and the server 5 are connected via a communication network 4. As a network, "LAN (Local Area Network)", "WAN (Wide Area Network)", "internet (Internet)", "cellular telephone network", a combination network thereof and/or the like may be used, but in the configuration according to the embodiments, the cellular telephone network and the Internet are used for connection to the server 5. The communication network 4 also allows two-way data communication between the repeater 3 and the server 5. Therefore, print related data may be transmitted from the repeater 3 to the server 5, and reversely, print related data may be transmitted from the server 5 to the repeater 3.

Here, access terminal equipment 17 is connected to the communication network 4. The access terminal equipment 17 belongs to a supplier company (MC) that supplies the inkjet printers or the inkjet printer system to the production company (PC). The access terminal equipment 17 is operated by a worker (operator) of the supplier company (MC) for update of control software for the inkjet printers after installation and maintenance such as replenishment of consumables such as ink, solvent and the like. For the access terminal equipment 17, a general-purpose computer (e.g., personal computer) may be used.

The communication network 4 further allows two-way data communication between the server 5 and the access terminal equipment 17. The print related data may be transmitted from the server 5 to the access terminal equipment 17, and reversely, the print related data may be transmitted from the access terminal equipment 17 to the server 5.

The printer group 1 is made up of a plurality of inkjet printers which are herein illustrated as two inkjet printers 6A, 6B. It goes without saying that although the two inkjet printers are illustrated in the embodiment, three inkjet printers or more may be used. It is noted that the inkjet printer 6B will be described as a representative in the following.

As described above, the inkjet printer 6B incorporates an ink tank used in printing so that the ink is fed to a print head. In the print head, the fed ink is converted into droplets and then the ink droplets are charged and deflected by an internal charging electrode and an internal deflection electrode to land on an object to be printed (e.g., PET bottle) for printing.

The inkjet printer 6B includes an input output section 11 for providing input and output of the print related data, a display section 12 for displaying the print related data, a controller (including memory) 13 for controlling the operation of the inkjet printer 6B, and the like. Various print related data is stored in the memory. In addition to controlling the operation of the inkjet printer 6B, the controller 13 described herein has a function of transmitting the print related data to the repeater 3, and a function of receiving the print related data from the repeater 3.

The controller 13 further has an encryption function for encrypting the print related data when transmitting it to the repeater 3, and a decryption function for decrypting the encrypted print related data when receiving it from the repeater 3.

The server 5 includes a storage section 7 having a database that stores and retains the print related data of the inkjet printer 6B, such as "text data", "text size", "print speed", "operating data" and data related to print of the control software to be updated and the like. The print related data in the storage section 7 is updatable, and for example, is updated to print related data sent from the repeater 33 or updated to print related data sent from access terminal equipment 17 which will be described later.

The server 5 also has a controller 8 that executes an arithmetic processing function, memory 9 that has a control program stored therein to execute the arithmetic processing in the controller 8, and an input output section 10 where the print related data transmitted from the repeater 3 is entered into the server 5 and output to the repeater 3.

The controller 8 further has an encryption function for encrypting the print related data when it is transmitted to the repeater 3, and a decryption function for decrypting the encrypted print related data when it is received from the repeater 3. Here, the encryption function and the decryption function of the inkjet printer 6B correspond to the encryption function and the decryption function of the server 5, respectively, such that a ciphertext encrypted with an encryption key received from the inkjet printer 6B is deciphered with a decryption key in the server 5, and likewise, a ciphertext encrypted with an encryption key received from the server 5 is decrypted with a decryption key in the inkjet printer 6B.

Further, the server 5 may receive search criteria via the input output section 10 from the access terminal equipment 17. The server 5 also may output a print related data portion meeting the requested search criteria, via the input output section 10 to the access terminal equipment 17, the print related data portion being selected from the print related data for the inkjet printer stored in the storage section 7.

The access terminal equipment 17 has: a human-machine communication function for allowing the operator to operate the inkjet printer system; a function for capturing print related data (update control software) for upgrading control software for the inkjet printer, and transmitting it to the server 5; a function of receiving and viewing the print related data transmitted from the server 5; and the like. The access terminal equipment 17 may use a general purpose computer (e.g., personal computer).

The repeater 3 is a relay facility for exchanging print related data between the server 5 and the inkjet printer 6B of the printer group 1. The repeater 3 has an input output section 14 including wireless capabilities, a controller 16 for storing incoming print related data, and a display section for displaying print related data and serving as a human-machine communication function for the operator. The repeater 3 here is a mobile terminal (so-called tablet terminal) which is carried by the operator. For the tablet terminal, "iPAD" (registered trademark) commercially available from Apple inc. in United States is used in the embodiments.

The repeater 3 captures and stores, in memory in its own controller 16, the print related data received in short-range wireless communication from the inkjet printer 6B over the short-range wireless network 2 from the inkjet printer 6B. The memory is read/rewritable memory, and RAM or flash ROM may be used.

At this time, the print related data received from the inkjet printer 6B has been encrypted, and this is stored in encrypted form in the repeater 3. The stored print related data is sent to the server 5 via the communication network 4 at this time, or alternatively, is transmitted to the server 5 via the communication network 4 at the time when required by the control operation of the operator.

The repeater 3 also captures and stores, in memory in its own controller 16, the print related data received from the server 5 over the communication network 4 from the server 5. The memory is read/rewritable memory, as described above.

The print related data received over the communication network 4 from the server 5 has been encrypted similarly to the above description, and is stored in encrypted form in the repeater 3. The stored print related data is sent to the inkjet printer 6B over the short-range wireless network 2 at this time, or alternatively, is sent to the inkjet printer 6B over the short-range wireless network 2 at the time when required by the control operation of the operator.

In this way, the controller 13 of the inkjet printer 6B encrypts the print related data used by the inkjet printer 6B with a unique cryptography key (encryption key) for transmitting it to the repeater 3, in order to transmit it as ciphertext to the repeater 3. In the repeater 3, the ciphertext is stored in encrypted form without being decrypted.

Then, the repeater 3 connects communication with the server 5 over the communication network 4 to transmit the stored, encrypted print related data of the inkjet printer 6B to the server 5. The server 5 may decrypt the received, encrypted print related data with the cryptography key (decryption key) in common with the inkjet printer 6B. It is noted that various keys may be used as the encryption key, the decryption key.

A distinctive configuration of the embodiment is that the repeater 3 including a storage unit is configured to be used to transmit the print related data over two-way and wireless communication between the server 5 and the inkjet printer 6B. In this respect, this is a different configuration from that of a "router" used at a typical access point.

Thus, the access point is for transmitting the print related data in real time by placing the "router" in a fixed position such as in a building or the like. The repeater 3 in the embodiment differs from the access point in that the print related data is temporarily stored by the storage unit of the portable repeater 3 and also the print related data is transmitted in a communicable area and also at an opportune time.

For example, in a production plant, there is a situation where a communication network such as Internet cannot be built on grounds of safety, environmental issues, installation cost, and/or the like at the site of a production line in which the inkjet printers are located. Further, a plurality of inkjet printers are installed on a production line. Therefore, the workload is enormously increased by building the communication network for managing all the inkjet printers using the so-called "router".

Because of this, for the purpose of simplifying the building of the communication network environment for the production line and of improving the usability, the portable repeater 3 capable of being carried is used to transmit the print related data over the two-way wireless communication between the server 5 and the inkjet printer 6B.

Thus, under the communication network environment such as the Internet communication, the operator uses the repeater (e.g., iPAD (registered trademark)) 3 to download the print related data from the server 6 over the communication network 4, and stores temporarily it in the memory of the repeater 3. Subsequently, the operator carries the repeater 3 with the memory storing the print related data and goes to a production line. Then, the operator transmits the print related data from the repeater 3 to the inkjet printer 6B using the short-range wireless communications (Bluetooth (registered trademark)). In this way, since the repeater 3 is readily moved by the operator, the building of the communication network environment for the production line may be simplified and further the usability may be improved.

Figure 3:
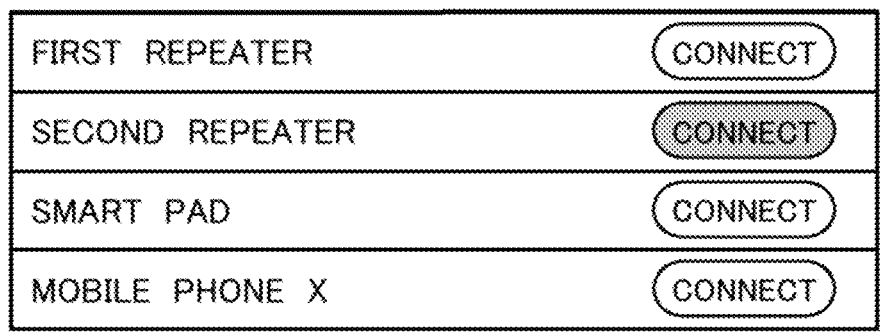
FIG. 3 is an explanatory diagram illustrating an operation screen for selecting a repeater on an inkjet printer.
Figure 4:
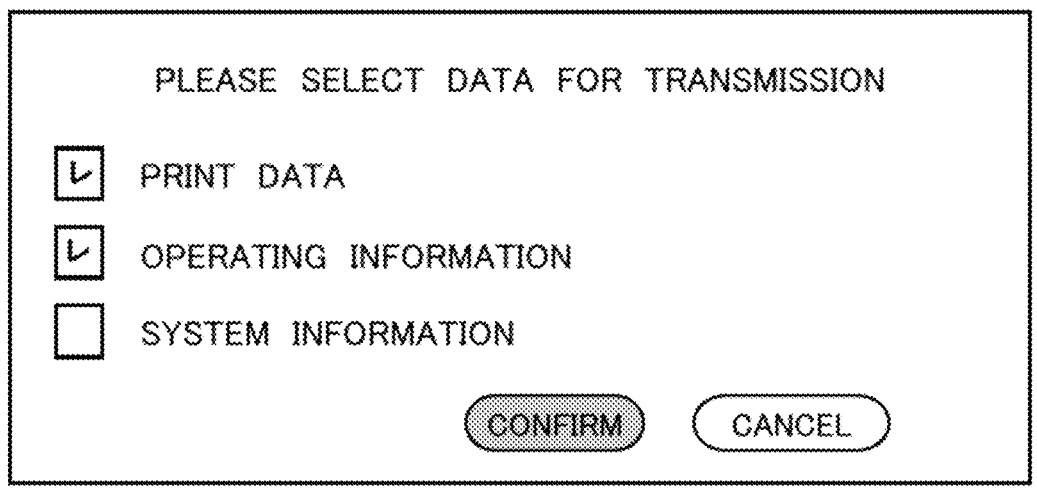
FIG. 4 is an explanatory diagram illustrating an operation screen for selecting transmission items of print related data to be sent from an inkjet printer to a repeater.

A control flow for transmitting print related data from the inkjet printer 6B to the repeater 3 will be described below with reference to FIG. 2 to FIG. 4. In this case, the operator with the repeater 3 moves to an area where the short-range wireless communication is available in order to establish the communication environment. For example, in the case of Bluetooth (registered trademark), if the operator approaches within a range of approximately 10 meters, the communication environment will be established. It is noted that FIG. 3 illustrates an example of operation screens for selecting the repeater 3 on the inkjet printer 8B, while FIG. 4 illustrates an example of operation screens for selecting transmission items of print related data to be sent from the inkjet printer to the repeater.

Step S10

In step S10, control is performed for selecting the repeater 3 to be connected to the inkjet printer 6B. The operator in the production line selects the repeater 3 while seeing a screen showing a list of facilities connectable over the near-range wireless communication as shown in FIG. 3, which is displayed on the display section 12 of the inkjet printer 6B. In FIG. 3, a second repeater is selected. The controller 13 of the inkjet print 6B transmits a connect request of the operator to the selected repeater 3 through the input output section 11. Upon transmission of the connect request to the selected repeater 3, the flow proceeds to step S11.

Step S11

At step S11, the response from the repeater 3 is confirmed. The repeater (second repeater) 3 is on standby for a connect request form the inkjet printer 6B, and upon determining that a connect request is made, the repeater 3 sends a response signal to the input output section 11 of the inkjet printer 6B.

If there is no response, response confirmation is maintained in step S11, again. Upon reception of a response from the repeater 3 indicating that it is ready to receive print related data, the flow proceeds to step S12.

Step S12

At step S12, the controller 13 of the inkjet printer 6B selects print related data to be transmitted to the repeater 3. The operator selects print related data to be sent to the repeater 3 while looking at the print related data displayed on the display section 12 of the inkjet printer 6B as shown in FIG. 4.

In FIG. 4, print data and operating information are checked. Based on this, the print data and the operation information are selected. As described earlier, the print data includes "text data", "text size", "print speed", and the like, and the operating information includes a time-of-day of operation, the ink level, an ambient temperature, and the like. It is obviously possible to include any other print related data than the above.

Then, the controller 13 of the inkjet printer 6B identifies and reads the selected print related data from the memory, and temporarily stores it in a predetermined storage area. Upon completion of the selection of the print related data, the flow proceeds to step S13.

Step S13

At step S13, the controller 13 reads the selected pint related data from the storage area and performs encryption processing thereon. The encryption processing is performed to transform the print related data to be transmitted to ciphertext using a predefined cryptography key. The print related data to be encrypted here is character/numeric string data within a pre-limited disclosed range. The print related data beyond the disclosed range is not selected and encrypted. After the print related data is encrypted, the flow proceeds to step S14.

Step S14

At step S14, the controller 13 transmits the encrypted print related data to the repeater 3 from the input output section 11 over the short-range wireless communication. The repeater 3 stores the received encrypted print related data in a predetermined storage area of the memory of the controller 16 in encrypted form without change.

In the embodiment, the encryption key and the decryption key are saved only in the inkjet printer 6B and the server 5, and are not saved in the repeater 3, so that the risk of leakage of the encryption key and the decryption key from the repeater 3 can be reduced. Therefore, even if the print related data transmitted from the inkjet printer 6B is temporarily saved in the repeater 3, read processing cannot be performed on the print related data because no cryptography key is saved therein.

it is noted that, in the inkjet printer 6B, the cryptography key may be updated at regular time intervals. Also, the operator may manually enter a new cryptography key on the human-machine communication screen of the display section 12 of the inkjet printer 6B.

After the encrypted print related data has been transmitted to the repeater 3, the flow proceeds to step S15.

Step S15

At step S15, a transmission result is displayed on the display screen of the display section 12 of the inkjet printer 6B. For example, by displaying a message saying "the transmission of the print related data is completed", the operator is notified of the completion of the transmission of the print related data. After this, the inkjet printer 6B terminates the control flow shown in FIG. 2.

A control flow for transmitting print related data from the repeater 3 to the server 5 will now be described with reference to FIG. 5 to FIG. 7. In this case, the operator carries the repeater 3 to establish communication environment which enabling connection to the server 5 under Internet environment. For example, the communication environment may be established using cellular telephone network or wireless LAN. It is noted that FIG. 6 illustrates an example of display screens for managing the inkjet printers in the access terminal equipment, and FIG. 7 illustrates an example of display screens for data management of the individual inkjet printers in the access terminal equipment.

Step S20

At step S20, the controller 8 of the server 5 is on standby for a connect request from the repeater 3. At this time, if the operator performs an operation for transmitting the print related data from the repeater 3, the server 5 receives the transmission and confirms that the print related data is sent from the repeater 3. Upon completion of the confirmation, the flow proceeds to step S21.

Step S21

At step S21, the encrypted print related data is received from the repeater 3. The received print related data is stored in a predetermined storage area of the memory 9 of the server 5. Upon completion of the reception of the print related data, the flow proceeds to step S22.

Step S22

At step S22, it is determined whether or not the print related data in which the received data is encrypted is decrypted. In the decryption in step S2, the encrypted print related data stored in the memory is read therefrom, and the decryption processing is performed thereon using the decryption key held by the controller 8 of the server 5. It is noted that the determination may be made from the received print related data.

Then, if it is determined in this control step that the print related data is not decrypted, the flow proceeds to step S23, but if it is determined that the encrypted print related data is decrypted, the flow proceeds to step S24.

Step S23

Since it is determined at step S22 that the print related data is not decrypted, a result indicating that data cannot be decrypted is transmitted to the repeater 3 at step S23. The repeater 3 receiving the result deletes the data transmitted to the server 5, from the memory of the controller 16 of the repeater 3. Then, the server 5 terminates the control flow shown in FIG. 5.

Step S24

Since it is determined at step S22 that the print related data is decrypted, the controller 8 analyzes the decrypted print related data at step S24. The analysis is performed of an inkjet printer for identification ID, operating status, data type, analysis date and time (save date and time), and the like. It is noted that the analysis data is set forth in FIGS. 6 and 7. Upon completion of the analysis, the flow proceed to step S25.

Step S25

At step S25, the analyzed print related data is stored and saved as a database in the storage section 7 of the server 5. The saved data is the analysis data which has been analyzed in step S24. Upon completion of the saving of the analysis data, the flow proceeds to step S26.

Step S26

At step S26, it is determined from the saved analysis data whether or not anomaly information and/or maintenance information are included. For example, the ink level and/or the amount of solvent remaining may be checked, and/or updating status of the control software and the like may be verified. Additionally, it should be no surprise that anomaly or a fault in the inkjet printer 6B may be checked.

Figure 5:
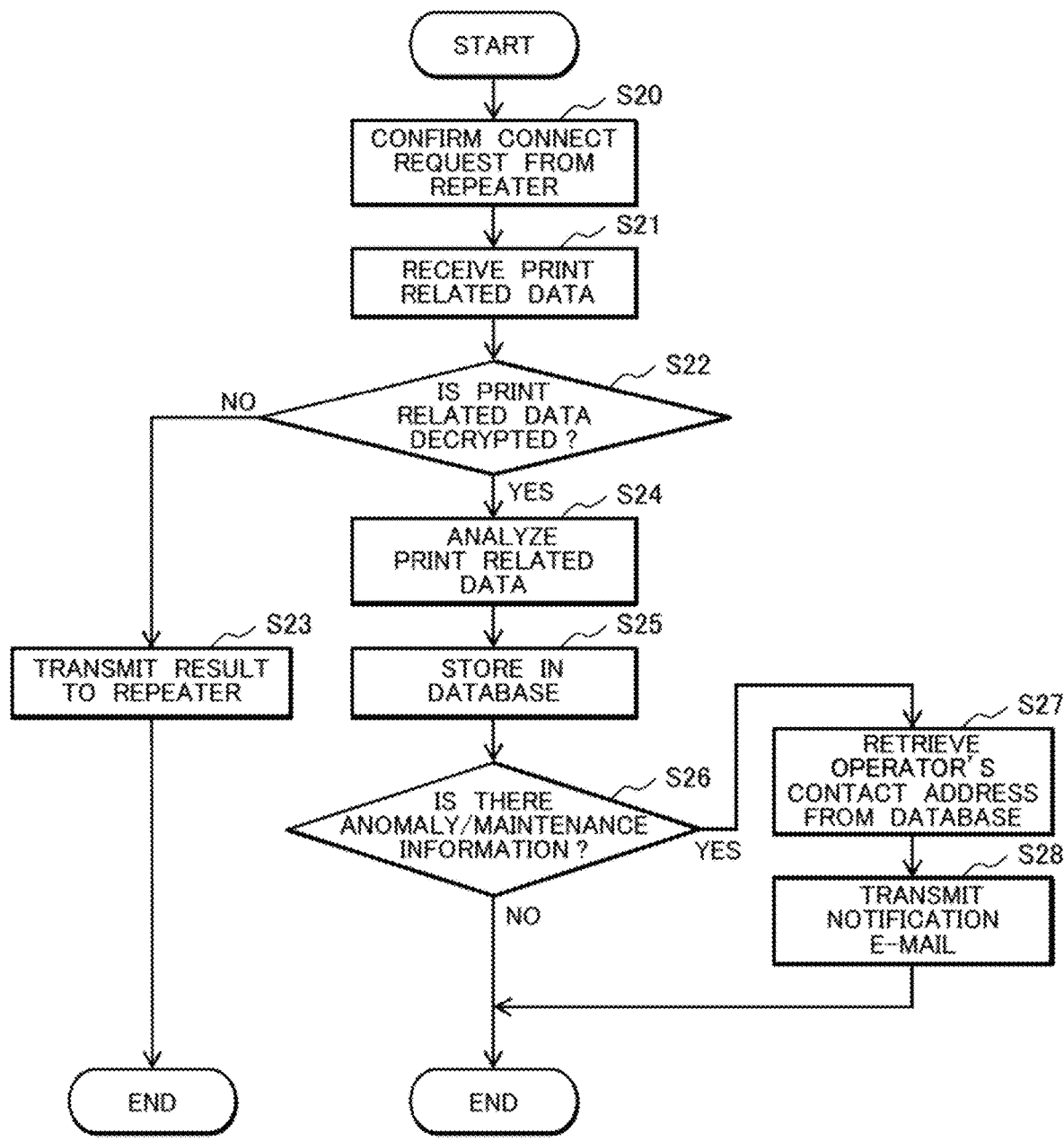
FIG. 5 is a flowchart illustrating a control flow for transmitting print related data from a repeater to a server.

If it is determined at step S26 that there is no anomaly or no maintenance is required, after that, the server 5 terminates the control flow shown in FIG. 5. On the other hand, if it is determined that there is anomaly or maintenance is required, the flow proceeds to step S27.

Step S27

At step S27, the processing is performed to retrieve an operator and the operator's e-mail address from the database in the storage section 7, the operator who can handle the abnormal conditions or maintenance request of the inkjet printer 6B. For example, in the case of a maintenance request such as insufficient ink or solvent, an operator carrying the repeater 3 is retrieved. In the case of upgrade of the control software, an operator of the access terminal equipment 17 is retrieved. Upon completion of the retrieval of the operator and the operator's e-mail address, the flow proceeds to step S28.

Step S28

At step S28, the abnormal conditions and/or maintenance information are transmitted to the e-mail address of the operator retrieved in step S27 to prompt the operator to handle the abnormal conditions and/or maintenance information. After that, the server 5 terminates the control flow shown in FIG. 5.

Here, as illustrated in FIG. 1, the print related data stored in the storage section 7 may be confirmed by accessing the server 5 from the access terminal equipment 17. Also, the access terminal equipment 17 is configured to send the selected specific print related data to the repeater 3 over the communication network 4 through the operation of the operator.

Then, for the specific print related data sent to and stored in the repeater 3, the operator of the repeater 3 may move closer to the inkjet printer 6B to send the selected specific print related data to the inkjet printer 6B over the short-range wireless communication.

FIG. 6 illustrates a list of the inkjet printers making up the printer group 1. The access terminal equipment 17 may be caused to access the server 5 to view the operating status of each of the inkjet printers. For example, the inkjet printers with printer IDs "001" to "003" are displayed as operating properly, the "004" inkjet printer is displayed as having a previous control software version, ant the "005" inkjet printer is displayed as having a low ink level.

Then, the operator of the access terminal equipment 17 may select a specific printer ID and view details of the management data of the selected inkjet printer. For example, if the inkjet printer with printer ID "002" in FIG. 6 is selected, the management data as illustrated in FIG. 7 is configured to be displayed. In FIG. 7, "data ID" and items such as "type" of the "data ID", "state", "data and time", and "selection of extraction and deletion" of data ID are displayed. It is noted that the "data IDs" are displayed on a time-series basis to be arranged in the order starting with the latest "data ID".

The access terminal equipment 17 also has the authority to manage the management data, and is able to extract the management data or delete the management data.

An embodiment where the control software is updated will now be described. For example, in the inkjet printer system or in a company supplying the inkjet printers, updating the control software often occurs. Therefore, as illustrated in FIG. 1, through the operation of the operator, the access terminal equipment 17 transmits the updated control software (hereinafter referred to as "update control software") to the server 5 over the communication network 4.

The server 5 stores the received update control software in a predetermined storage area of the storage section 7. The server 5 also notify the repeater 3 of the fact that the control software has been updated by e-mail over the communication network 4. The operator of the repeater 3 receiving the notification brings the repeater 3 closer to the inkjet printer, so that the update control software stored in the repeater 3 is stored in the memory of the controller 13 of the inkjet printer to update the control software.

A specific control flow will be described below with reference to FIGS. 8 and 9. FIG. 8 illustrates the case where the update control software is transmitted from the server 5 to the repeater 3. FIG. 9 illustrates the case where the update control software is transmitted from the repeater 3 to the inkjet printer 6B.

Step S30

At step S30, control is performed to select the repeater 3 to be connected to the server 5.

Figure 2:
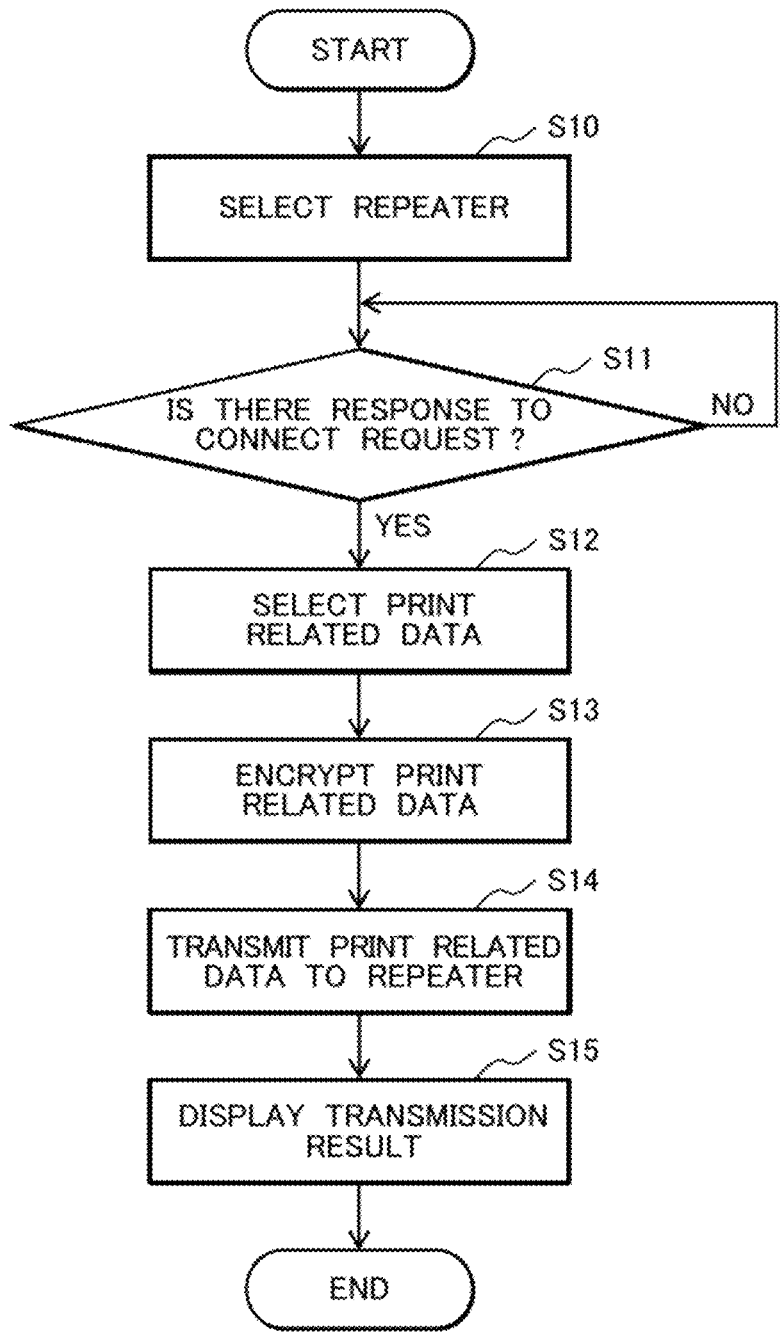
FIG. 2 is a flowchart illustrating a control flow for transmitting print related data from an inkjet printer to a repeater.

In FIG. 8, assuming that a second repeater is selected as illustrated in FIG. 2. After transmitting a connect request to the selected repeater (second repeater) 3, the controller 8 of the server 5 goes to step S31.

Step S31

At step S31, a response from the repeater 3 is confirmed. The repeater 3 is on standby for a connect request from the server 5. Then, if determining that a connect request is made, the repeater 3 sends a response signal to the input output section 10 of the server 5. If there is no response, response confirmation is maintained in step S31, again. Upon reception of a response from the repeater 3 indicating that it is ready to receive the update control software, the flow proceeds to step S32.

Step S32

At step S32, the controller of the server 5 selects the update control software to be transmitted to the repeater 3. For example, the update control software may be automatically selected in the server 5 or alternatively selected from the access terminal equipment 17.

Then, the controller 8 of the server 5 identifies the selected update control software, and reads the selected update control software from the memory, and temporarily stores it in a predetermined storage area. Upon completion of the selection of the update control software, the flow proceeds to step S33.

Step S33

At step S33, the controller 8 reads the update control software from the storage area and performs encryption processing thereon. The encryption processing is performed to transform the update control software to be transmitted to ciphertext using a predefined cryptography key. After the update control software is encrypted, the flow proceeds to step S34.

Step S34

At step S34, the controller 8 transmits the encrypted update control software to the repeater 3 from the input output section 10 over the communication network 4. The repeater 3 stores the received encrypted update control software in a predetermined storage area of the memory of the controller 16 in encrypted form without change.

In the embodiment, the encryption key and the decryption key are saved only in the inkjet printer 6B and the server 5, and are not saved in the repeater 3, so that the risk of leakage of the encryption key and the decryption key from the repeater 3 may be reduced. Upon transmission of the encrypted update control software to the repeater 3, the flow proceeds to step S35.

Step S35

At step S35, the server 5 transmits a transmission result to the access terminal equipment 17. For example, a message saying "the transmission of the update control software is completed" is transmitted to the access terminal equipment 17. The access terminal equipment 17 may display the message saying "the transmission of the update control software is completed" on the display section thereof. After this, the server 5 terminates the control flow shown in FIG. 8.

A control flow for transmitting the update control software from the repeater 3 to the inkjet printer 6B will be below described with reference to FIG. 9. In this case, the operator brings the repeater 3 closer to the inkjet printer 6B to establish communication environment where the short-range communication with the inkjet printer 6B is made available.

Step S40

At step S40, the controller 13 of the inkjet printer 6B is on standby for a connect request from the repeater 3. At this time, if the operator performs an operation for transmitting the update control software from the repeater 3, the inkjet printer 6B receives the transmission and confirms that the update control software is sent from the repeater 3. Upon completion of the confirmation, the flow proceeds to step S41.

Step S41

At step S41, the encrypted update control software is received from the repeater 3. The received update control software is stored in a predetermined storage area of the memory of the controller device 13 of the inkjet printer 6B. Upon completion of the reception of the update control software, the flow proceeds to step S42.

Step S42

At step S42, it is determined whether or not the received encrypted update control software is decrypted. In step S42, the encrypted update control software stored in the memory at step S41 is read therefrom, and the decryption processing is performed thereon using the decryption key held by the controller 13.

Then, if it is determined at step S42 that the encrypted update control software is decrypted, the flow proceeds to step S43. On the other hand, if it is determined that the update control software is not decrypted, the flow proceeds to step S44.

Step S43

Since it is determined at step S42 that the encrypted update control software is decrypted, the decrypted update control software is stored in the memory of the controller 13 at step S43. It is noted that the encrypted update control software received at step S41 is deleted because this is not required to be stored. After that, the update control software is executed, thereby allowing the inkjet printer 6B to perform the printing operation.

Step S44

Since it is determined at step S42 that the encrypted update control software is not decrypted, it is determined at step S44 whether or not the number of times the decryption is rejected reaches a predetermined number of times (five in this instance). If the number of times the decryption is rejected does not exceed five times, the flow proceeds to step S45. If it exceeds five times, the flow proceeds to step S46.

Step S45

At step S45, the decryption key is updated and the processing in step S42 is repeated. The controller 13 of the inkjet printer has a decryption key updating function. Therefore, if the decryption fails at step S42, protection can be given based on the assumption that the current decryption key has been updated or the validity period has expired.

At step S45, therefore, a new decryption key is input for unlocking the encryption by the authority of the operator. Upon update to the new decryption key, the flow proceeds back to step S42 to perform similar operation over at most five times.

Step S46

Since it is determined at step S44 that the number of times the decryption is rejected reaches a predetermined number of times, five times in this instance, at step S46, the non-decrypted update control software is deleted and the rejection count counted at step S45 is reset to "zero". After that, the inkjet printer 6B terminates the control flow illustrated in FIG. 9.

Here, the inkjet printer 6B transmits, to the repeater 3, failing to update the control software. Thus, the operator receiving the transmission may make notification to the server via the communication network to request transmission of the update control software once more.

As described above, the communication (communication network line) 4 between the server 5 and the repeater 3, and the communication (short-range wireless communication) 2 between the repeater 3 and the inkjet printer 6B take communication forms independent of each other. In addition, the repeater 3 intervening between the communication forms includes a storage unit for storing the print related data.

Therefore, the server 5 and the inkjet printer 6B are not necessarily required to be connected at the same time. And, the print related data may be sent via the repeater 3 at any given location and at any given time of day using any one of the communications. Thus, the network environment may be built in the already-existing production line without much cost. Further, because the repeater 3 may be used to transmit the print related data, the usability is enhanced.

According to the present invention, a portable repeater having a carriageable storage function is interposed between an inkjet printer and a server. And also, it is configured that the inkjet printer and the repeater are communicated with each other over short-range wireless to transmit print related data from the inkjet printer to the repeater or from the repeater to the inkjet printer, and the repeater and the server are communicated with each other over a communication network to transmit print related data from the server to the repeater or from the repeater to the server.

Thus, a network environment may be built in the already-existing production line without much cost and further a more user-friendly inkjet printer system may be provided.

It is to be understood that the present invention is not limited to the above exemplary embodiments and is intended to embrace various modifications. For example, the above exemplary embodiments have been described in detail for the purpose of providing a better understanding of the invention, and the present invention is not necessarily limited to including all the configurations described above. It is also to be understood that a portion of the configuration of one exemplary embodiment may be substituted for a configuration of another exemplary embodiment, and operator's a configuration of one exemplary embodiment may be added to a configuration of another exemplary embodiment. Further, for a portion of the configuration in each exemplary embodiment, addition, deletion and substitution of another configuration may be made.

REFERENCE SIGNS LIST

1 . . . printer group,
2 . . . short-range communication network,
3 . . . repeater (tablet terminal),
4 . . . communication network,
5 . . . cloud server,
6A, 6B . . . inkjet printer,
7 . . . storage section,
8 . . . controller,
9 . . . memory,
10 . . . input output section,
11 . . . input output section,
12 . . . display section,
13 . . . controller,
14 . . . input output section,
15 . . . display section,
16 . . . controller,
17 . . . access terminal equipment,
PC . . . production company,
MC . . . supplier company.

The invention claimed is:

1. An inkjet printer system, comprising:
a repeater of a portable type that includes a carriageable storage unit and is interposed between an inkjet printer and a server,
wherein the inkjet printer and the repeater are communicated with each other over short-range wireless to transmit print related data either from the inkjet printer to the repeater or from the repeater to the inkjet printer, and the repeater and the server are communicated with each other over a communication network to transmit the print related data either from the server to the repeater or from the repeater to the server,
wherein the print related data sent from the inkjet printer to the repeater over the short-range wireless is stored in the storage unit installed in the repeater, and the print related data stored in the storage unit is sent from the repeater to the server over the communication network,
the print related data sent from the server to the repeater over the communication network is stored in the storage unit installed in the repeater, and the print related data stored in the storage unit is sent from the repeater to the inkjet printer over the short-range wireless, and
wherein each of the print related data sent from the inkjet printer to the server via the repeater and the print related data sent from the server to the inkjet printer via the repeater is encrypted with an encryption key, and
each of the server and the inkjet printer has a decryption key to decrypt the print related data which has been encrypted and sent thereto.

2. The inkjet printer system according to claim 1,
wherein the repeater does not have the decryption key to decrypt the print related data which has been encrypted.

3. The inkjet printer system according to claim 2,
wherein the repeater includes at least a short-range wireless communication unit, a network communication unit, and a temporary storage unit for storing temporarily the print related data.

4. The inkjet printer system according to claim 1,
wherein the server is capable of communicating over the communication network with access terminal equipment externally located, and the access terminal equipment is invested with authority to allow viewing of the print related data in the server.

5. An inkjet printer system, comprising:
a repeater of a portable type that includes a carriageable storage unit and is interposed between an inkjet printer and a server,
wherein the inkjet printer and the repeater are communicated with each other over short-range wireless to transmit print related data either from the inkjet printer to the repeater or from the repeater to the inkjet printer, and the repeater and the server are communicated with each other over a communication network to transmit the print related data either from the server to the repeater or from the repeater to the server,
wherein the server is capable of communicating over the communication network with access terminal equipment externally located, and the access terminal equipment is invested with authority to allow viewing of the print related data in the server, and
wherein update control software for the inkjet printer is sent to the server from the access terminal equipment over the communication network,
the update control software sent to the repeater from the server over the communication network is stored in the storage unit installed in the repeater, and the update control software stored in the storage unit is sent to the inkjet printer from the repeater over the short-range wireless.

6. The inkjet printer system according to claim 5,
wherein the inkjet printer, the repeater and the server belong to a production company that produces products, and
the access terminal equipment belongs to a supplier company that supplies the inkjet printer to the production company.

7. The inkjet printer system according to claim 5,
wherein the update control software sent to the inkjet printer from the server via the repeater is encrypted with an encryption key,
the inkjet printer has a decryption key to decrypt the update control software which has been encrypted and sent thereto, and
if the inkjet printer fails to decrypt the update control software using the decryption key a predetermined number of times, the inkjet printer disposes of the update control software.

* * * * *